United States Patent [19]
Alliff

[11] Patent Number: 5,433,357
[45] Date of Patent: Jul. 18, 1995

[54] LOAD CARRYING VEHICLE ACCESSORY

[76] Inventor: David R. Alliff, Lot 13 Powderhorn La., Malvern of Madison, Madison, Va. 22727

[21] Appl. No.: 322,296

[22] Filed: Oct. 4, 1994

[51] Int. Cl.⁶ .............................................. B60R 9/06
[52] U.S. Cl. .................................. 224/510; 224/410; 224/526
[58] Field of Search ............... 224/42.43, 42.03 R, 224/42.03 A, 42.03 B, 42.04, 42.05, 42.07, 42.08, 42.44, 42.13; 280/504, 505, 515, 186, 760, 769

[56] References Cited

U.S. PATENT DOCUMENTS

| | | | |
|---|---|---|---|
| 1,564,776 | 12/1925 | Green | 224/42.13 |
| 3,554,415 | 1/1971 | Woods | 224/42.05 |
| 3,581,828 | 6/1971 | Thune | 280/760 |
| 3,785,541 | 1/1974 | Sibley | 224/42.08 |
| 3,891,132 | 6/1975 | Chandler | 224/42.03 B |
| 4,915,276 | 4/1990 | Devito | 224/42.43 |
| 5,033,662 | 7/1991 | Godin | 224/42.03 A |
| 5,224,636 | 7/1993 | Bounds | 224/42.07 |

Primary Examiner—Robert M. Fetsuga
Assistant Examiner—Gregory M. Vidovich
Attorney, Agent, or Firm—Terrance L. Siemens

[57] ABSTRACT

An improved load carrying vehicle accessory is disclosed. Mounting tubes are fixed to the rear fenders of a vehicle, such as a lawn tractor. The load carrying portion of the device has mounted within its base, and protruding therefrom, a pair of support arms or tubes that are configured to cooperate with the mounting tubes, preferably with coaxial telescopic interengagement. The support arms or tubes are disposed in slots wider than themselves to allow for lateral movement and subsequent fixing in place, thus allowing the load carrying portion to be fitted to a variety of vehicles having different widths. Additionally, the load carrying portion has removable walls, to allow for bulkier items such as rakes, brooms, shovels and the like, to be secured thereto.

4 Claims, 3 Drawing Sheets

LOAD CARRYING VEHICLE ACCESSORY

BACKGROUND OF THE INVENTION

1. Field of the Invention

The present invention relates to load carrying vehicle accessories. More specifically, it relates to a load carrying vehicle accessory that is removably attachable to the rear fenders of a vehicle by the permanent attachment of mounting devices thereto. Even more specifically, it relates to a removable load attachment carrying means wherein the load carrying portion is a deck with removable side walls, the deck being supported by a pair of tubes, the deck also including means to adjust the width therebetween, and where the tubes are slidably engageable with the mounting devices and including a means to fixedly engage and disengage the support tubes with the mounting devices. More generally, the present invention can be applied to any situation where a removable load carrying portion is desired, such as attaching waste cans and recycling bins to the side of a dwelling or business.

2. Description of the Prior Art

Wheeled, powered vehicles are well known and popular devices for use around the house, lawn work, gardening, and the like. Though these vehicles are useful, one of the drawbacks is, if the user wishes to transport heavy or bulky objects from one portion of the work area, garden, or lawn to another, these objects must be carried or placed in a wheelbarrow (or like device) for transport. Trailers are available that can be attach to existing lawn tractors, but these are clumsy and require an inordinate amount of storage space. The present invention seeks to obviate the problems presently inherent in the art by providing a load carrying attachment that can be easily engaged and disengaged with the tractor. The present invention is not towed, so that maneuverability of the tractor is not affected, and the side walls of the load carrying deck can be removed, to allow for the carrying of bulky objects such as rakes, shovels, and the like. Additionally, the present invention includes a support tube carrying slot within the load carrying deck that is wide enough to allow the support tubes to be adjusted laterally therein, so that the invention can fit a variety of differently sized vehicles as sold: that is "off the shelf" without difficult modifications.

During a search at the U.S. Patent and Trademark Office a number of patents were discovered that relate to the present invention and they are discussed hereinafter:

First is U.S. Pat. No. 2,425,892 issued on Aug. 19, 1947 to John I. Michaels. This discloses a pickup bed for tractors wherein a receptacle bed is placed over existing tension links and their attendant drawbar to allow for load hauling or to counterbalance loads or forces applied to the forward portion of the tractor. This is dissimilar from the present invention in that no attachment means are placed on the tractor that slidably engage the support members of the load carrying bed.

In U.S. Pat. No. 2,442,889 issued on Jun. 8, 1948 to Alvin E. Deal there is disclosed a combined tractor and truck body wherein a pair of tubes are mounted above the chassis of the vehicle and bolted thereto. The detachable body has an integral pair of beams spaced apart the same distance as the tubes. The beams are inserted into the mounted tubes and secured with a plurality of bolts. Unlike the present invention, there is no teaching of the removable walls on the load carrying portion, nor is their teaching of the lateral engagement pin, used to fix the bed in relationship with the mountings. This laterally disposed pin allows for a quicker release than could be accomplished in the Deal patent. Additionally, the means for varying the distance between the supporting tubes, thus allowing the load carrying portion of the present invention to fit vehicles with different widths is not taught.

Next is U.S. Pat. No. 4,277,008 issued on Jul. 7, 1981 to Donald J. McCleary for a multi-purpose rack and hitch for an all terrain vehicle. This is clearly unlike the present invention in that a plurality of attachment arms are disposed on each side of the center line of the vehicle body. Additionally, the disclosed rack and hitch is not taught to be readily detachable in the manner of the instant invention.

The next patent in this discussion is U.S. Pat. No. 4,300,706 issued on Nov. 17, 1981 to Pete Hendrick et al. This discloses a luggage carrier for a three wheel motorcycle. This is obviously dissimilar from the instant invention in that the attachment of the device actually alters the position of the seat when attached requiring its removal from the vehicle. The latch brackets are disclosed as being located under the seat, wherein the instant invention, the attachment means are located on either side of the vehicle center line, on either side of the seat.

In U.S. Pat. No. 4,522,420 issued on Jun. 11, 1985 to Gerald J. Hannappel there is disclosed an all terrain vehicle conversion system. Supports attached to the rear of the vehicle are designed to retain a load carrying portion, among other things, with a quick disconnect attachment means. Unlike the present invention, the load carrying portion of the apparatus does not include a means for altering the distance between the supporting tubes to allow the load carrying portion to be attached to a variety of vehicles.

In U.S. Pat. No. 4,770,440 issued on Sep. 13, 1988 to Glyn F. Lander there is disclosed a combination utility attachment and stand for a riding mower. The device has a vertically oriented frame attached to the rear of the mower. The upper portion of the frame supports a load carrying receptacle that includes a pivotable rear wall. Attached to the lower portion of the frame is a lower load support shelf. These two walls/shelves in conjunction with the frame can constitute an elongated platform for storing the mower on its end. Contrast this to the present invention wherein the mounting tubes are attached to the upper surfaces of the rear fenders and where the load carrying portion, supported on a pair of protruding support tubes, is inserted therein and attached thereto with a quick detachment means.

Another patent of interest is U.S. Pat. No. 4,809,891 issued on Mar. 7, 1989 to Michael C. Patrin. This discloses a motorcycle luggage rack wherein the load supporting platform extends rearwardly and laterally from the back of the motorcycle at approximately the same height as the rear axle. A front and two side railings are provided, and the entire assembly is attached by a three point hitch. This is dissimilar from the present invention in that there is no teaching of mountings attached on the exterior of the fender, nor is any support tube adjustment means disclosed to allow the rack to be fit to vehicles having various widths.

In U.S. Pat. No. 4,915,276 issued on Apr. 10, 1990 to Ermin Devito there is disclosed a mounting assembly for a carrier accessory that extends behind vehicles such as a car or a van. Mounting brackets are attached to a tow hitch located on the underside of the vehicle. A frame assembly for support of the carrier assembly is then inserted into the mounting brackets. The frame assembly is made up of two interlocking U-shaped members that can be slidably adjusted to one another to allow for different vehicle widths. This construction is dissimilar from the present invention in that there is no teaching of an adjustment means that includes support tube adjustment slots being parallel to the centerline of the vehicle and contained within the load carrying base as described in the instant invention.

U.S. Pat. No. 5,033,662 issued on Jul. 23, 1991 to Patrick Godin discloses a vehicle mounted carrier system. The frame of this apparatus includes projecting arms that are engaged with tubular receivers attached to the chassis of the vehicle. Unlike the present invention, however, there is no teaching of these arms being adjustable either towards or away from each other to allow for the attachment of the carrier portion of the device to vehicles of differing widths.

Lastly, U.S. Pat. No. 5,224,636 issued on Jul. 6, 1993 to Dayne L. Bounds discloses a utility rack. A pair of bracket means are attached to the chassis of a vehicle. The brackets include sleeves for slidably receiving first and second arms and they both include locking means to affix the arms in relation to themselves. The first and second arms, in turn, are attached to a platform to which a pivotable fence is attached for securing any load carried thereon from inadvertent lateral movement. A plurality of sliding members, each consisting of a generally U-shaped member with a straight bottom portion, depend from the platform and these bottom portions are engaged with fixed sleeves on the arms. Thus the arms can be moved to the proper distance from one another to engage the chassis brackets. This is unlike the present invention in that the support tube adjustment means described herein consists of grooves or slots within the base of the load carrying portion of the device. These slots are parallel to the center line of the vehicle and are wider than the support tubes, thus allowing the support tubes to be laterally moved back and forth therein until the proper distance between them has been reached to allow coaxial telescopic engagement with the mounting tubes.

None of the above inventions and patents, taken either singly or in combination, is seen to describe the instant invention as claimed.

SUMMARY OF THE INVENTION

The present invention is an improved load carrying vehicle accessory. Mounting tubes are fixed to the rear fenders of a vehicle, such as a lawn tractor. The load carrying portion of the device has mounted within its base, and protruding therefrom, a pair of support arms or tubes that are configured to cooperate with the mounting tubes, preferably with coaxial telescopic interengagement. The support arms or tubes are disposed in slots wider than themselves to allow for lateral movement and subsequent fixing in place, thus allowing the load carrying portion to be fitted to a variety of vehicles having different widths. Additionally, the load carrying portion has removable walls, to allow for bulkier items such as rakes, brooms, shovels and the like, to be secured thereto.

Accordingly, it is a major goal of the invention to provide a load carrying vehicle accessory that overcomes the disadvantages of the prior art.

Moreover, it is a principal object of the invention to provide a load carrying vehicle accessory that is easily attached and detached to the vehicle.

It is another object of the invention to provide a load carrying vehicle accessory wherein mounting tubes are fixed on the exterior surface of the rear fenders of the vehicle and coaxial telescopic engagement with protruding support tubes attached to the load carrying portion of the device is enabled.

It is a further object of the invention to provide a load carrying vehicle accessory where a detachable locking means is provided between the mounting tubes and the protruding support arms to fix them in relation to one another and secure the load carrying portion of the device to the vehicle.

Still another object of the invention is to provide lateral adjustment means for each of the support arms, where the lateral adjustment means are slots in the base of the load carrying portion of the device where the support arms are disposed, the slots being wider than the support arms to allow them to be moved laterally, such that the distance from one to the other can be altered, thus allowing the load carrying portion of the device to be attached to vehicles of varying widths.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
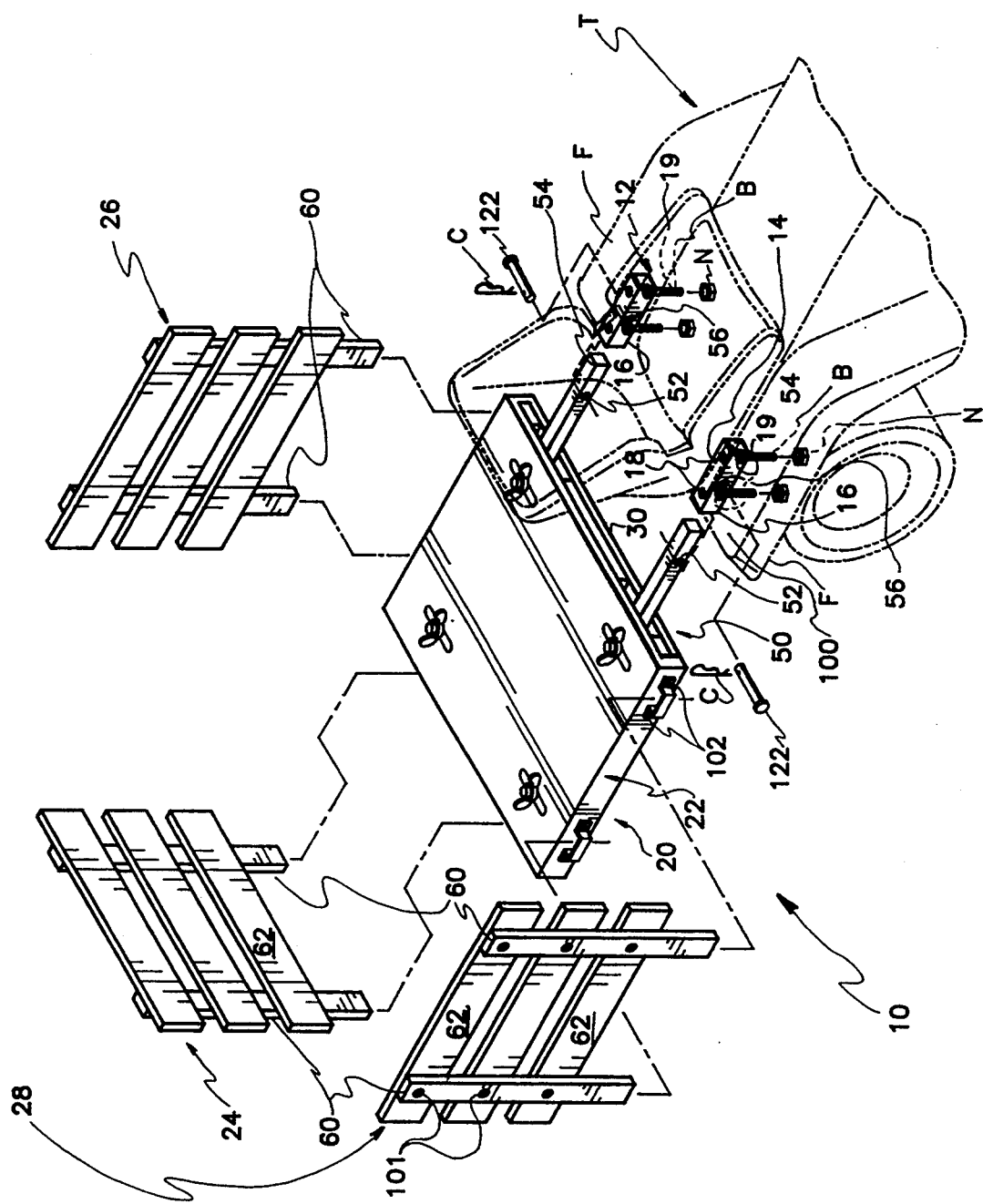
FIG. 1 is an exploded environmental perspective view of the present invention.

The present invention is indicated generally at 10 in FIG. 1. The load carrying accessory 10, in this preferred embodiment, is attached to a lawn tractor T. The lawn tractor T has fenders F covering both of the rear wheels W. Mounted on the generally flat top portion 100 of the fenders F are the mounting tubes or support arm receivers 12. Though only one of these mounting tubes 12 is clearly seen in FIG. 1, it should be understood that both the mounting tubes 12 are substantially identical to one another. In the preferred embodiment described herein, they are made of aluminum tubing having a generally rectangular cross section and each of the four sides is approximately one and one half inches (1½") in length. In the top wall 14 and bottom wall 16 of each of the mounts 12 are aligned apertures 18, 19. These apertures 18 allow the user to place the mounts 12 in the desired position on the top portion 100 of the fenders F. It is contemplated that the apertures would be approximately one quarter of an inch (¼") in diameter. A drill (not shown) is used to drill through the fender F and then bolts B (seen in FIG. 1) are placed therethrough and nuts N are tightened to affix the mounts 12 in place. Other types of fastening means, such as adhesives, screws, or the like could of course be substituted without departing from the spirit of the invention. The bottom apertures 19 of the mounting tubes 12 would, preferably, be beveled to allow the bolt head to flush fit with the interior bottom wall of the mount 12 to allow the coaxial telescopic interengagement between the mounts 12 and the supporting arms 50 (as will be discussed further below). Also in each of the mounts 12 is a laterally aligned set of apertures 56 which will be discussed further hereinafter.

The discussion now turns to the load carrying portion 20 of the accessory 10. This includes a base 22, a rear wall 24, a first side wall 26, and a second side wall 28. As seen in FIG. 1, protruding from the front 30 of the base 22 are a pair of support arms 50. These are dimensioned such that they fit inside the mounting tubes 12 in a coaxial telescopic interengagement in the embodiment described herein, that would call for a rectangular cross section with an edge length of approximately one inch (1"). The support arms 50 could be solid, but it is contemplated that they could be made of aluminum tubing similar to those of the mounts 12, this material providing sufficient strength for the intended use combined with low weight. A lateral bore 52 is located within each of the extending ends 54 of the protruding arms 50. In the preferred embodiment the rear wall 24 is fixed to the base to prevent any carried items from spilling out backwardly when the tractor T is put into motion, however the side walls 26 and 28 are removable to allow the user to carry such items as rakes, shovels, or other elongate bulky objects within the accessory 10. All of the walls 24, 26, and 28 are constructed similarly. It is contemplated that, when in place, they would rise approximately ten inches (10") above the top of the base 22. Vertical support members 60 support a plurality of cross members 62. Preferably, the length of these cross members 62 would be approximately eighteen and three quarter inches (18¾") in length to compliment the length of the sides of the base 22. For low cost of manufacture and aesthetic appearances, these members 60, 62 could be made of wood, such as white pine and could be attached together by various fastening means 101 (seen in FIG. 1) such as nails, bolts, screws, or the like. Other materials would, however, occur to the skilled artisan. As mentioned above the rear wall 24 is fixed to the base 22 in the preferred embodiment. This could be accomplished by any number of rear wall fastening means (not shown) such as nails, screws, adhesives, and the like. Turning our attention now to the side walls 26, 28, they are removable from the base 22 in this embodiment of the present invention. This accomplished by providing post guides 64 along the sides 66, 68 (both seen in FIG. 2) of the base 22. These posts are attached by screws 102 or the like to the sides 66, 68. Thus, as can be best seen in FIG. 1, one or both of the side walls 26, 28 can be lifted out of the guides 64 to leave one or both sides open.

Figure 2:
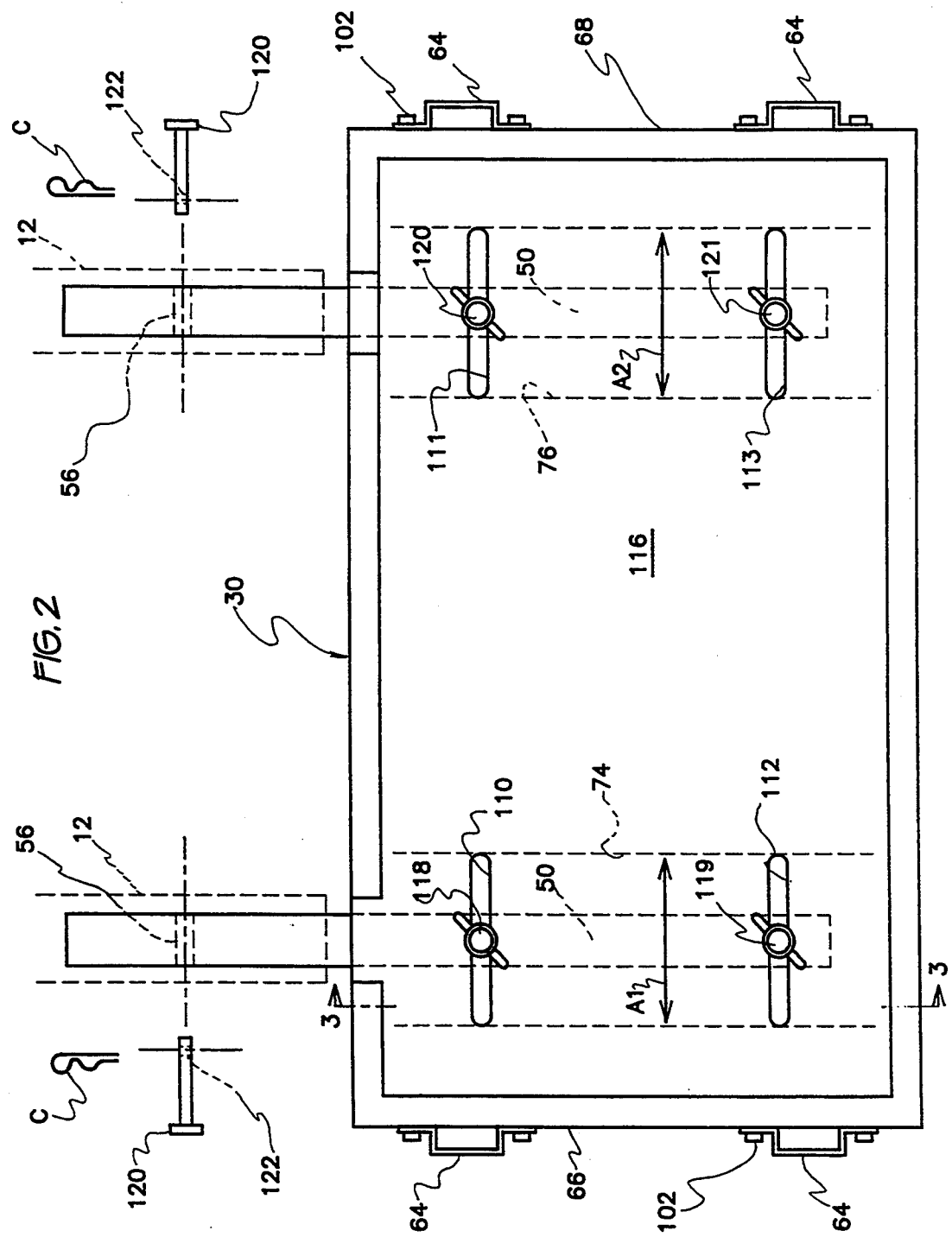
FIG. 2 is a top plan view of the base of the load carrying portion of the present invention showing the slots allowing lateral travel of the support arms.
Figure 3:
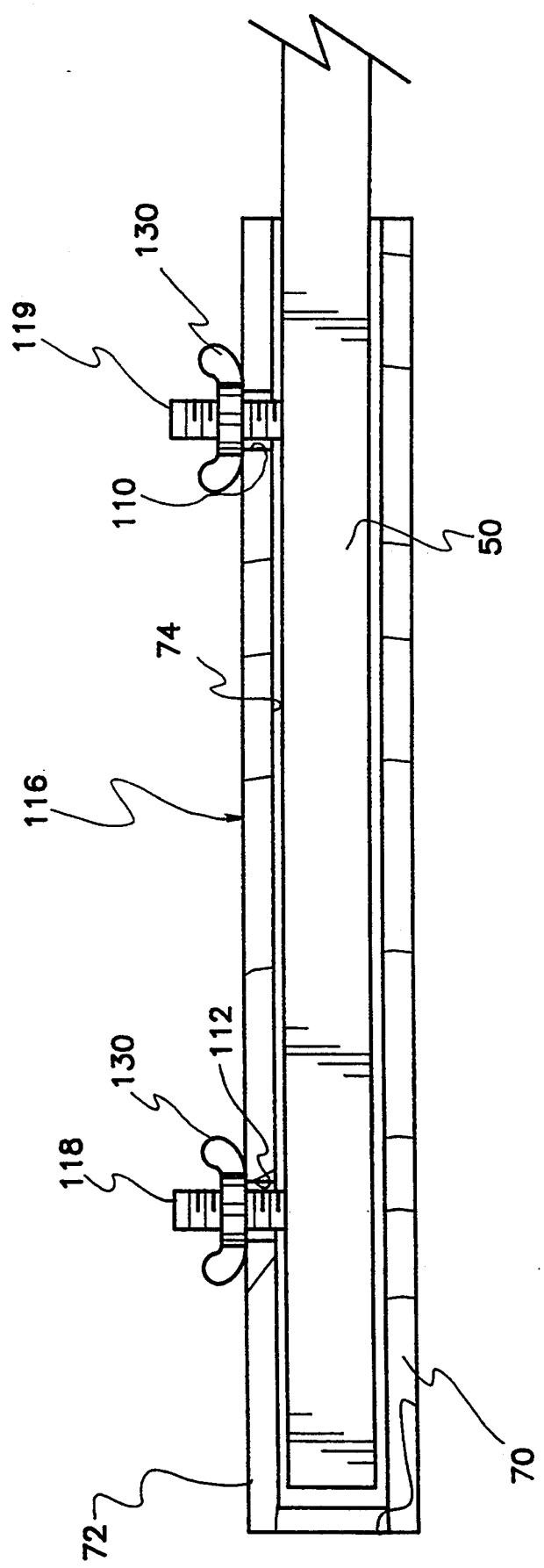
FIG. 3 is a view taken along line 3—3 in FIG. 2.

Turning now to FIGS. 2 and 3, the support arm adjustment means will now be detailed. The base 22 of the load carrying portion 20 of the load carrying accessory 10 is made up of two generally overlying pieces. The bottom piece 70 is preferably a piece of plywood or like substance and the upper piece 72 is preferably another piece of wood with two internal grooves 74 and 76 extending upwards thereinto. These internal grooves 74, 76 are shown in dotted lines in FIG. 2. The pieces 70, 72 and the internal grooves 74, 76 are dimensioned such that the support arms 50 can be placed therein with freedom to move laterally as indicated by the directional arrows A1 and A2 in FIG. 2. Thus, the support arm adjustment means allows the user to vary the distance between the support arms 50. Internal groove 74 has positioned thereabove a pair of slots 110, 112. The internal groove 76 has positioned thereabove a pair of slots 111, 113. These slots 110, 111, 112, 113 extend substantially completely laterally across the internal grooves 74, 76 and provide fluid communication between the interior surfaces of the grooves and the load surface 116 of the load carrying portion 20. This is best seen in FIG. 3 with the example of internal groove 74. This arrangement allows the load carrying accessory 10 to be used with vehicles having varying widths. Thus, as an "off the shelf" item, it can accommodate a large number of lawn tractor brands of different sizes, obviating the need for different load carrying portions 20 to be manufactured for differing brands. It is contemplated that the variance between smallest and largest distance would be approximately six inches (6") to allow the supporting arms 50 to be disposed within fourteen to sixteen (14"–16") from one another. It has been observed that this allows the load carrying accessory to be fitted to most riding mowers and lawn tractors. Once the support arms 50 have been moved into proper lateral alignment for coaxial telescopic interengagement with the mount tubes 12, the arms 50 are fixed into place to prevent inadvertent dislodgement. In the preferred embodiment, this is accomplished by threaded protrusions 118, 119, 120, and 121 (all four seen in FIG. 2) that extend from the support arms 50 to a level above their respective slots. Referring to FIG. 2, which shows internal groove 74 with one of the support arms therein, threaded protrusions 118, 119 extend upwardly from the support arm 50 through the slots 110, 112 and terminate above the load support surface 116. Butterfly bolts 130 are tightened down, thus fixing support arm 50 in its place.

Referring now to FIGS. 1 and 2, once the mounting tubes 12 are fixed on to the fender of the tractor T, any time that the user wishes to carry an item or items to a distant location in the work area, The extending ends 54 of the support arms 50 are slid within the mounting tubes 12 in a telescopic engagement. An interengagement nut 120 is placed through the laterally aligned apertures 56 in the mounts 12 and through the corresponding apertures 52 in the support arms 50. Cotter pins C are preferably then inserted through interengagement nut apertures 122 to hold mounts 12 and support arms 50 in place. The desired item or items may then be placed in the load carrying portion of the device and transported It is to be understood that the present invention is not limited to the sole embodiment described above, but encompasses any and all embodiments within the scope of the following claims.

I claim:

1. A load carrying vehicle accessory for a vehicle having rear fenders disposed over the rear wheels, and where the rear fenders define an inner fender side and an outer fender side comprising:

mounting tube means including installation means for affixing said mounting tube means to the outer fender side of the vehicle;

load carrying portion, said load carrying portion including a base portion, said base portion being generally planar and rectangular and having a front wall, a rear wall, and two side walls, where said rear wall has fixedly attached thereto an upwardly extending rear fence means, and where each of said side walls has removably attached thereto an upwardly extending side fence means;

a pair of load carrying portion support arms attached to said load carrying portion, said support arms disposed substantially parallel to said side walls, each of said support arms including an extending portion, each of said extending portions extending from said front wall of said base portion and where each of said extending portions is adapted for coaxial telescopic interengagement with said mounting tube means on the outer fender of the vehicle; and support arm adjustment means for adjusting the lateral distance between said support arms such that said support arms are laterally adjustable to accommodate and engage said mounting tube means, wherein said support arm adjustment means includes a pair of slots within said base portion of said load carrying portion, both of said slots being generally parallel to said side walls and extending from said front wall rearwardly and terminating proximate said rear wall, each of said slots dimensioned to accept one of said support arms such that said support arms are carried within said slots and each is free to travel laterally a predetermined distance from said side walls.

2. The vehicle accessory as claimed in claim 1, wherein said base portion includes an underlying base portion and an overlying base portion, said overlying base portion having a top defining a load carrying surface and where said adjustment slots are defined by a cutout area in between said overlying and underlying base portions, said cutout areas defining a slot interior wherein said support arms are carried.

3. The vehicle accessory as claimed in claim 2, wherein said support arm adjustment means includes a support arm fixing means, said fixing means comprising at least one elongate aperture perpendicular to each of said slots, said elongate aperture dimensioned to carry an integral upstanding support arm guide extension therethrough, each of said elongate apertures allowing fluid communication to exist between said slot interior and said load carrying surface.

4. The vehicle accessory as claimed in claim 3, wherein said guide extension is threaded and engagement means is provided therewith to frictionally engage said load carrying surface and said guide extension such that said support arm is held in a predetermined location in relation to said side walls of said base portion.

* * * * *

UNITED STATES PATENT AND TRADEMARK OFFICE
CERTIFICATE OF CORRECTION

PATENT NO. : 5,433,357
DATED : July 18, 1995
INVENTOR(S) : David R. Aliff

It is certified that error appears in the above-indentified patent and that said Letters Patent is hereby corrected as shown below:

On the title page item [76],

Change the inventor's last name from, "Alliff'" to --Aliff--.

Change the inventor's address from, "13 Powderhorn La., Malvern of Madison, Madison, Va. 22727," to --Lot 130 Powderhorn La., Malvern of Madison, Madison, Va. 22727--.

Signed and Sealed this

Third Day of October, 1995

Attest:

BRUCE LEHMAN

*Attesting Officer*     *Commissioner of Patents and Trademarks*